United States Patent
Rangaswamy et al.

(10) Patent No.: US 8,919,724 B2
(45) Date of Patent: Dec. 30, 2014

(54) MOUNT FOR CRYOGENIC FAST SWITCHING MECHANISM

(75) Inventors: Anjali Rangaswamy, Redondo Beach, CA (US); Geoffrey A. Long, Torrance, CA (US); Kelly L. Jung, Los Angeles, CA (US); Gregory L. Klotz, La Verne, CA (US)

(73) Assignee: Raytheon Company, Waltham, MA (US)

( * ) Notice: Subject to any disclaimer, the term of this patent is extended or adjusted under 35 U.S.C. 154(b) by 347 days.

(21) Appl. No.: 12/862,596

(22) Filed: Aug. 24, 2010

(65) Prior Publication Data

US 2012/0049026 A1    Mar. 1, 2012

(51) Int. Cl.
*G02B 7/02*    (2006.01)

(52) U.S. Cl.
CPC ..................... *G02B 7/028* (2013.01)
USPC ............ 248/603; 248/683; 359/819; 359/820

(58) Field of Classification Search
CPC .......... G02B 7/02; G02B 7/023; G02B 7/025; G02B 7/026; G02B 7/028
USPC .......... 359/818, 820, 819, 811; 248/592, 603, 248/604, 611, 612, 613, 683, 693; 396/529
See application file for complete search history.

(56) References Cited

U.S. PATENT DOCUMENTS

| | | | | |
|---|---|---|---|---|
| 2,808,762 A | * | 10/1957 | Grave, Jr. | 359/830 |
| 4,733,945 A | * | 3/1988 | Bacich | 359/820 |
| 4,778,252 A | * | 10/1988 | Filho | 359/819 |
| 5,488,514 A | * | 1/1996 | Bruning et al. | 359/811 |
| 6,239,924 B1 | | 5/2001 | Watson et al. | |
| 6,525,888 B2 | * | 2/2003 | Schletterer | 359/822 |
| 6,574,053 B1 | * | 6/2003 | Spinali | 359/819 |
| 6,873,478 B2 | | 3/2005 | Watson | |
| 7,113,263 B2 | * | 9/2006 | Ebinuma et al. | 355/75 |
| 7,529,046 B2 | * | 5/2009 | Schletterer et al. | 359/819 |
| 8,705,006 B2 | * | 4/2014 | Schoeppach et al. | 355/67 |
| 2002/0126398 A1 | * | 9/2002 | Moriya | 359/819 |
| 2006/0056083 A1 | * | 3/2006 | Sudoh | 359/819 |
| 2010/0097697 A1 | * | 4/2010 | Takemura et al. | 359/399 |
| 2010/0128367 A1 | * | 5/2010 | Beckenbach et al. | 359/820 |
| 2011/0109891 A1 | * | 5/2011 | Farnsworth et al. | 355/67 |

OTHER PUBLICATIONS

Pollard, L. W., "Design of a Flexure Mount for Optics in Dynamic and Cryogenic Environments", NASA Contractor Report 177495, (136 pages) (Feb. 1989).
RTV 566—GE Silicones, http://www.dcproducts.com.au/RTV_Silicone_Solutionsifech_Data_Sheets/RTV566-tds.pdf (achived: Jul. 19, 2008) (6 pages).
Canyoncruz (Mechnical), http://www.eng-tips.com/viewthread.cfm?qid=151121&page=2 (Apr. 22, 2006) (p. 3 of 4).

* cited by examiner

*Primary Examiner* — Terrell McKinnon
*Assistant Examiner* — Eret McNichols
(74) *Attorney, Agent, or Firm* — Renner, Otto, Boisselle & Sklar, LLP

(57) ABSTRACT

A mount for a mountable element includes a frame, and a plurality of flexures supported by the frame. The plurality of flexures are configured to be outwardly extended against a restorative bias, so that the element can be inserted therebetween. The mount further includes a plurality of intermediate bonds that may be inserted between the plurality of flexures and the element while the plurality of flexures are outwardly extended. Among other things, a system and method mounting the element are also disclosed.

7 Claims, 12 Drawing Sheets

MOUNT FOR CRYOGENIC FAST SWITCHING MECHANISM

This invention was made with United States government support. The United States government has certain rights in the invention.

BACKGROUND

This disclosure relates generally to mounting apparatuses. More particularly, this disclosure may relate to mounting elements that may be subjected to a variety of operating and environmental stresses.

The mounting of various mountable elements, such as optical elements, may become a nontrivial and difficult task under various environmental or operating conditions. For example, some optical elements are very thin, and may have a tendency to break or distort from their desired optical properties under various conditions. Some environments may affect the interaction of the optic element and its mounting in ways that could result in such undesired deformation or destruction. In some cases, the mount for the optic element may transfer external forces onto the optic element itself. The risk of deformation or harm to mountable elements, like the optic element, imparted by such forces may be particularly significant in areas of enhanced thermal and acceleration variances.

As one example, when the mountable elements and their mountings are designed to operate in cryogenic conditions, the stresses on the mountable element may vary depending on whether the element is in ambient temperatures or cryogenic temperatures. For example, when such elements are designed to be launched into space, the temperature of their environment may change radically from the time at which the elements and their mountings are being assembled on the ground, to the time at which the elements and their mountings are operating in space. The temperature variance in space may also fluctuate depending on whether the elements and mountings are in sunlight or are out of sunlight.

In some embodiments, the mountable elements and their mountings may be designed to operate under acceleration variances. For example, in cases where the elements are mounted in fast switching mechanisms, switching from one element to another may cause great acceleration stresses on the mountable element and its mount. As another example, when the elements are designed to be launched into space, the accelerations and gravitational forces that the optics are subjected to during the launch may additionally stress the optics and mountings. In some cases, the combination of both thermal and acceleration stresses may compound the likelihood of deformity or damage to the mounted element. Once in space, further operation in a micro-gravity environment may present its own challenges in the mounting securing the mounted element.

What is needed is, among other things, improvements over known mounts that reduce the likelihood of deformity or damage to mounted elements, such as optic elements, during stresses imparted by temperature and acceleration variances.

SUMMARY

According to an embodiment, a mount for a mountable element includes a frame defining a central aperture. The mount further includes a plurality of grooved flexures mechanically coupled to the frame, defining a grooved portion around a periphery of the central aperture. The flexures are configured to be outwardly extendable against a restorative bias, for receiving an edge portion of the mountable element in the grooved portion. The mount 100 further includes a plurality of intermediate bonds, arranged between the plurality of grooved flexures and the mountable element. The intermediate bonds are configured to cushion the mountable element against an acceleration of the mount, and to compensate for a mismatch between different coefficients of thermal expansion of the flexures and the mountable element, so as to reduce a distortion of the mountable element.

According to another embodiment, a system for mounting a mountable element comprises a mount having a frame defining a central aperture, and a plurality of flexures supported by the frame. The system further includes an insertion tool configured to outwardly extend the plurality of flexures, for insertion of the mountable element therein. The system further includes a bond material applied between the mountable element and each of the plurality of flexures.

According to another embodiment, a method for mounting a mountable element comprises outwardly extending a plurality of flexures supported by a frame. The method further includes inserting the mountable element between the plurality of flexures. The method further includes applying a bond material between the plurality of flexures and the mountable element.

Other aspects and embodiments will become apparent from the following detailed description, the accompanying drawings, and the appended claims.

BRIEF DESCRIPTION OF THE DRAWINGS

Various features of embodiments of this disclosure are shown in the drawings, in which like reference numerals designate like elements.

DETAILED DESCRIPTION

Figure 1:
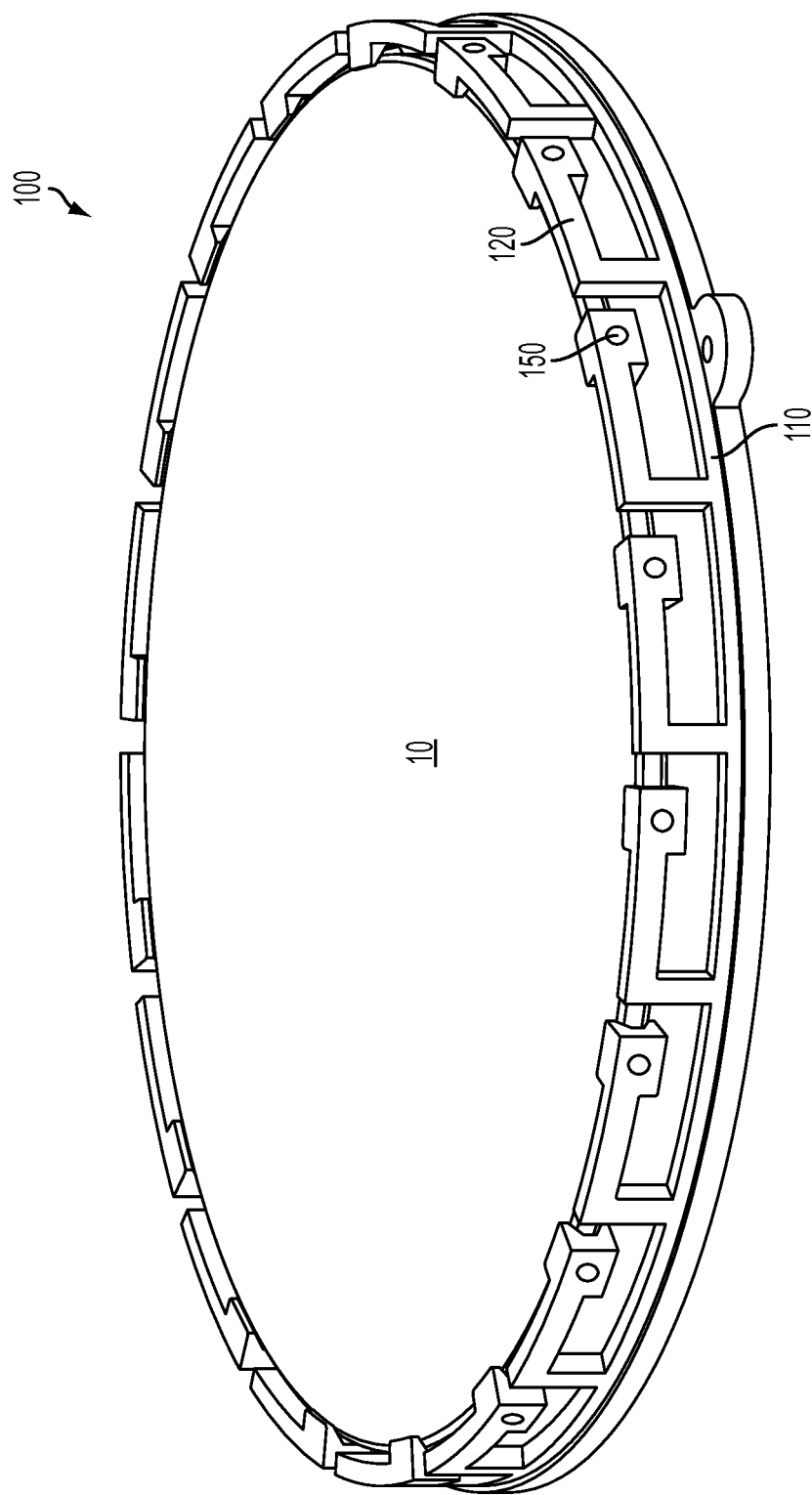
FIG. 1 shows a perspective view of a mount with an element in accordance with an embodiment, having a plurality of flexures with an intermediate bond supporting the element.
Figure 2:
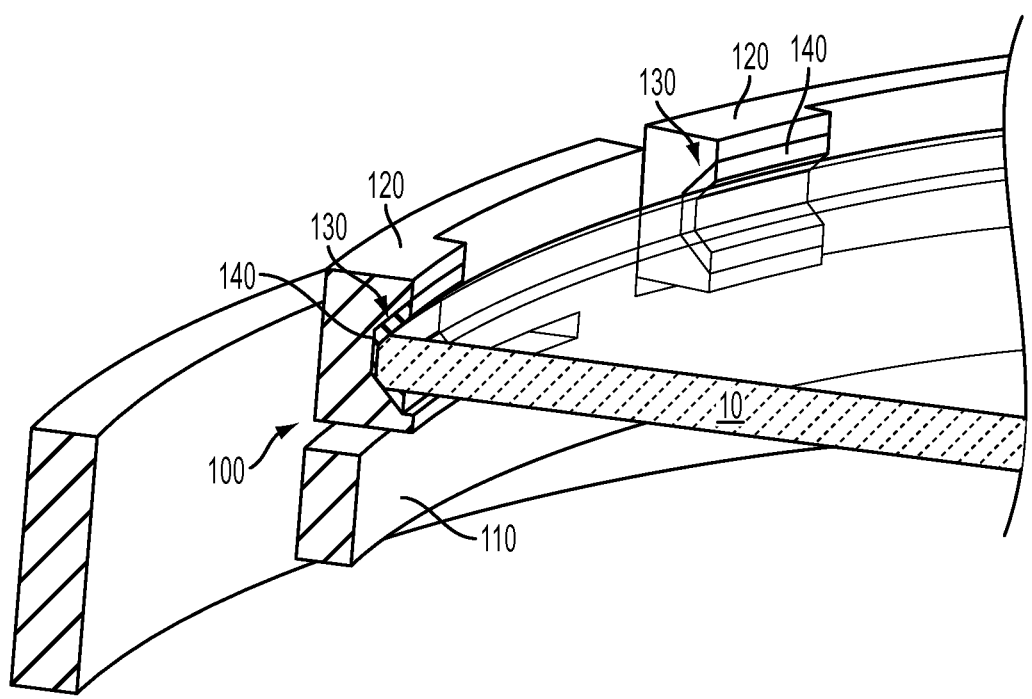
FIG. 2 shows a cross sectional perspective view of the mount and element of FIG. 1.

FIG. 1 depicts mountable element 10 (hereinafter element 10), retained by mount 100. Although as shown, element 10 is optical in nature, element 10 may be any suitable object configured to be retained within mount 100. Element 10 of the illustrated embodiment is shown to be a filter, however in various embodiments element 10 may be any suitable optic element, including but not limited to a mirror, a lens, diffraction grating, a plate having one or more apertures, or any other transparent or opaque element. In other embodiments, the mountable element may be any other type of object, including but not limited to a target, a plate, radiation shielding, or so on. As such, element 10 may be of any suitable construction or configuration, including but not limited to glass, metal, plastic, crystal, or so on.

Mount 100 includes frame 110 configured to support plurality of flexures 120. Frame 110 may be of any suitable construction or configuration, including but not limited to metals such as titanium or steel, for example. In an embodiment, the weight of mount 100 may be of concern above certain tolerances, and thus the material for frame 110, or other elements of mount 100, may be selected accordingly. In an embodiment, plurality of flexures 120 may be integrally molded to frame 110. Where plurality of flexures 120 are integrally molded or otherwise formed with frame 110, frame 110 may be constructed from a ductile material, permitting a degree of flexure for pre-loading of plurality of flexures 120 with respect to frame 110, as will be described in greater detail below. In other embodiments, plurality of flexures 120 are otherwise coupled, bonded, or fixed to frame 110 in a manner that may permit outward extendibility against a restorative bias for plurality of flexures 120.

Frame 110 may be of any suitable shape, and may define a central aperture, around which plurality of flexures 120 are positioned, and in the direction of which plurality of flexures 120 may be biased. Although in the illustrated embodiment, frame 110 is shown to be curved in an annular shape (i.e. defining a circular or elliptical central aperture), in other embodiments, frame 110 and the central aperture thereof may be multi-sided. In an embodiment frame 110, and plurality of flexures 120 may define a central aperture in any geometric shape, including but not limited to that of a triangle, a rectangle (or square), a pentagon, a hexagon, or so on. In an embodiment, the number of flexures in plurality of flexures 120 may correspond to the number of sides in the shape of the central aperture. For example, where frame 110 is in the shape of a square, plurality of flexures 120 may comprise four flexures, one flexure associated with each side of frame 110. In an embodiment wherein frame 110 is annular, defining a circular or elliptical central aperture, the number of flexures may depend on the size of the central aperture (and thus the size of element 10), the size of each flexure, and so on. For example, in the non-limiting illustrated embodiment, plurality of flexures 120 comprises eighteen flexures integrally molded to frame 110, forming a central aperture approximately two inches in diameter. In some embodiments, the number of flexures in plurality of flexures 120 may be selected based on the desire to distribute forces during acceleration of mount 100.

In an embodiment, each of plurality of flexures 120 may comprise grooved portion 130 oriented inward along a periphery of the central aperture. Grooved portions 130 together for the plurality of flexures 120 may form a receiving space configured to receive element 10 therein. In various embodiments, each grooved portion 130 may be shaped as a semicircle, a half-hexagon, or any other beveled or rounded geometric shape that may provide full capture of an edge portion of element 10 therein. Thus, the size of grooved portion 130 may correspond to a thickness of element 10. In an embodiment, the edge portion of element 10 may be smaller than a maximal thickness of element 10, which may be located in the interior of element 10, such as at the center of element 10 associated with the center of the central aperture. In an embodiment, insertion of element 10 into the receiving space defined by grooved portions 130 may require outward extension of plurality of flexures 120 for element 10 to pass through a space where an inwardly extending edge of plurality of flexures 120 normally resides, as will be described in greater detail below. In embodiments wherein element 10 is circular, and frame 110 is annular, the outward extension of plurality of flexure 120 may be radial. As noted, in an embodiment plurality of flexures 120 may have a restorative bias, which may predispose plurality of flexures 120 to return to their original positions once element 10 is placed into the central aperture.

In an embodiment, intermediate bonds 140 (hereinafter bonds 140) may be placed into grooved portions 130 between each of plurality of flexures 120 and an associated portion of the outer edge of element 10. Bonds 140 may be configured to have sufficient give to cushion element 10 against an acceleration of mount 100. For example, under high acceleration, the metal of plurality of flexures 120 may otherwise rub against element 10, which may cause debris generation. Such debris generation may result from the cracking or grinding of the edges of element 10. Such cracking or grinding may result in the complete failure of element 10. Additionally, where element 10 is being used in a micro-gravity such as outer space, even a small amount of debris generation may be particularly harmful the system that is utilizing element 10, as debris may migrate to float in front of element 10, potentially obscuring or hindering the optical functionality and quality of element 10.

Bonds 140 may also compensate for a difference in coefficients of thermal expansion between plurality of flexures 120 and element 10. As frame 110 (and associated plurality of flexures 120) and element 10 may have differing coefficients of thermal expansion, the move from ambient temperatures to cryogenic temperatures, the capture of element 10 by mount 100 may fail. Bonds 140 may be of any suitable construction or configuration. The selection of bonds 140 may depend, among other things, on the elastomeric or thermal variances desired. In an embodiment, bonds 140 may comprise a room temperature vulcanizing (RTV) material. In an embodiment, bonds 140 may comprise a silicone rubber material. Non-limiting examples of materials for bonds 140 include RTV566, CV-2566, and CV2500.

As shown in FIG. 1, in an embodiment, each of a plurality of grooved flexures 120 may comprise apertures 150, providing access to an area between element 10 and each of plurality of flexures 120. Apertures 150 may be configured so that bond 140 may be injected into grooved portion 130, around the edge of element 10, as will be described in greater detail below. In an embodiment, once bond 140 is injected into aperture 150, it may be permitted to cure, to provide cushioning between flexures 120 and element 10. In an embodiment, bond 140 may adhere to flexures 120 and/or the edge of element 10. In an embodiment, plurality of flexures 120 and/or all or part of element 10 (such as the edge portion of element 10) may be primed or pre-treated to activate the adhering qualities of bond 140 when bond 140 is injected into aperture 150. In other embodiments, bond 140 may merely fill the gap between flexures 120 and element 10, acting as a cushioning agent without acting as a retaining agent. In such embodiments, a preloading of plurality of flexures 120 may be sufficient to secure element 10 in mount 100 without stressing bond 140 to failure. In some embodiments, a lack of adhesion between bonds 140 with element 10 and/or flexures 120 may result in a reduced maximal acceleration tolerance for mount 100.

In an embodiment, the compensating effects of bonds 140 may reduce distortion of element 10. For example, in the illustrated embodiment, wherein element 10 is an optic element, distortion of element 10 may correspond to an increased wavefront error. In an embodiment, bond 140 may be sufficient to enable a transmitted wavefront error of less than 0.006 µm/0.6" diameter area, over a temperature range of approximately 135K to 298K, and an acceleration of up to approximately 12500 rad/s$^2$. Such a temperature range may be the result of a change to a desired operating temperature, a change in environmental operating temperature (such as a move from an Earth based laboratory to space following a launch). Furthermore, such acceleration may correspond to the use of mount 100 in a high speed switching mechanism, such as one performing a 60 degree switch in approximately 30 ms, depending on the arm length of an arm holding mount 100, and the weight of mount 100 and element 10 (affecting inertia to switch).

Figure 3:
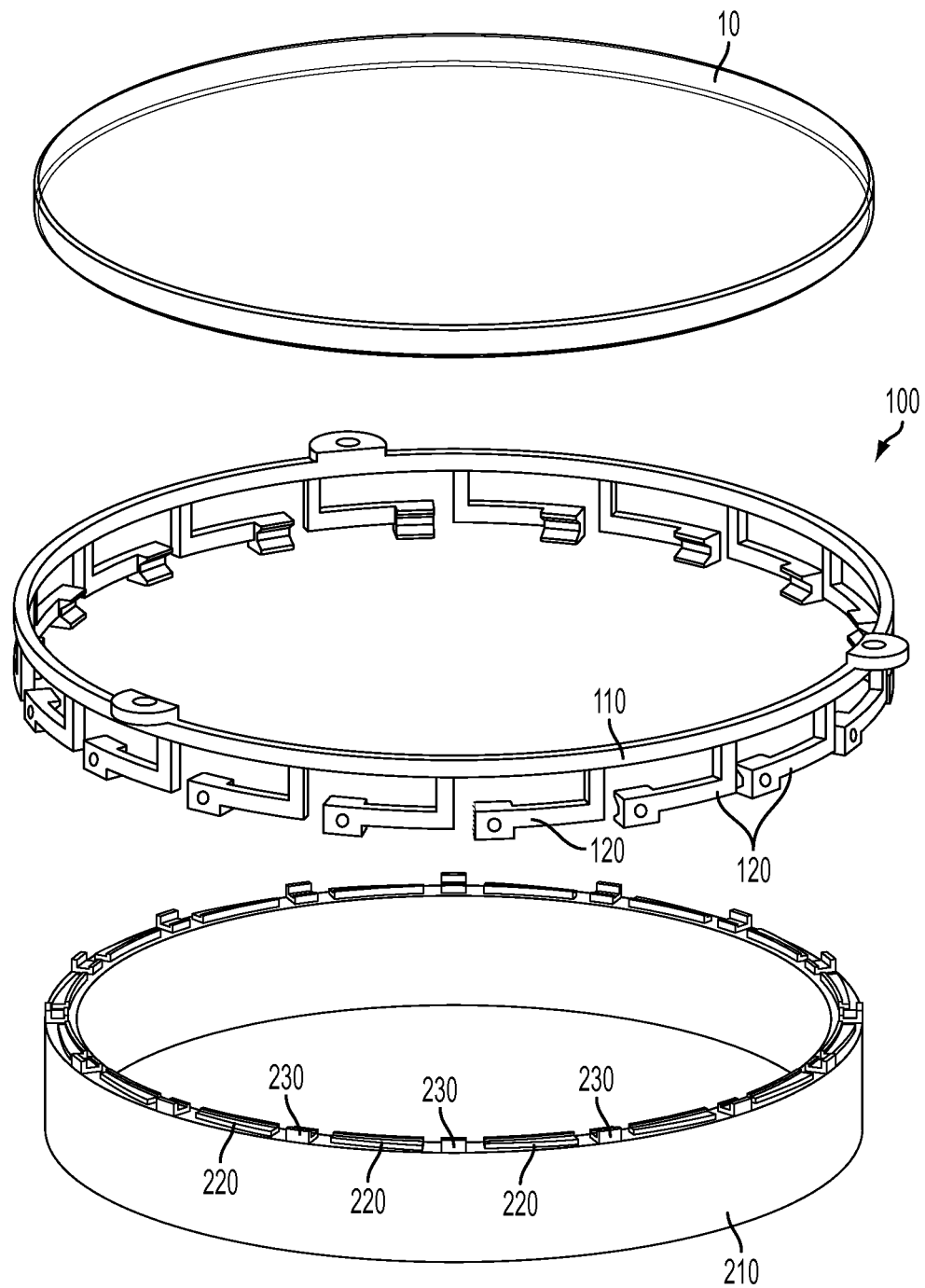
FIG. 3 shows an exploded perspective view of the assembly of the mount and element of FIG. 1, showing an insertion tool configured to outwardly extend the plurality of flexures.

Among other things, other aspects of the present disclosure relate to a system and method for mounting element 10 into mount 100. As shown in FIG. 3, system 200 for mounting element 10 into mount 100 comprises both element 10 and mount 100, as well as insertion tool 210. As described above, mount 100 comprises frame 110 defining a central aperture, and plurality of flexures 120 supported by frame 110. Insertion tool 210 is configured to outwardly extend plurality of flexures 120, for insertion of element 10 therein. As shown, insertion tool 210 may include plurality of ramps 220, each ramp 220 associated with one of plurality of flexures 120. As shown, mount 100 may be lowered onto insertion tool 210, such that plurality of flexures 120 are associated with portions of ramps 220 that do not correspond with extension of plurality of flexures 120. Ramps 220 may be shaped such that rotation of insertion tool 210 or mount 100 with respect to one another may drive plurality of flexures 120 along the inclines of ramps 220, extending plurality of flexures 120 outward. In an embodiment, stop tabs 230 may be located near or at ends of ramps 220 corresponding to a maximal extension of plurality of flexures 120, such that no further rotation of mount 100 and insertion tool 220 with respect to one another may take place to result in further outward extension of plurality of flexures 120, or the slippage of plurality of flexures 120 off the edges of ramps 220 associated with maximal extension of flexures 120. In other embodiments, such as when frame 110 of mount 100 is not round, insertion tool 210 may comprise a design configured such that a downward force on insertion tool 210 pushes on a lip on each of flexures 120, outwardly extending flexures 120.

Figure 4A:
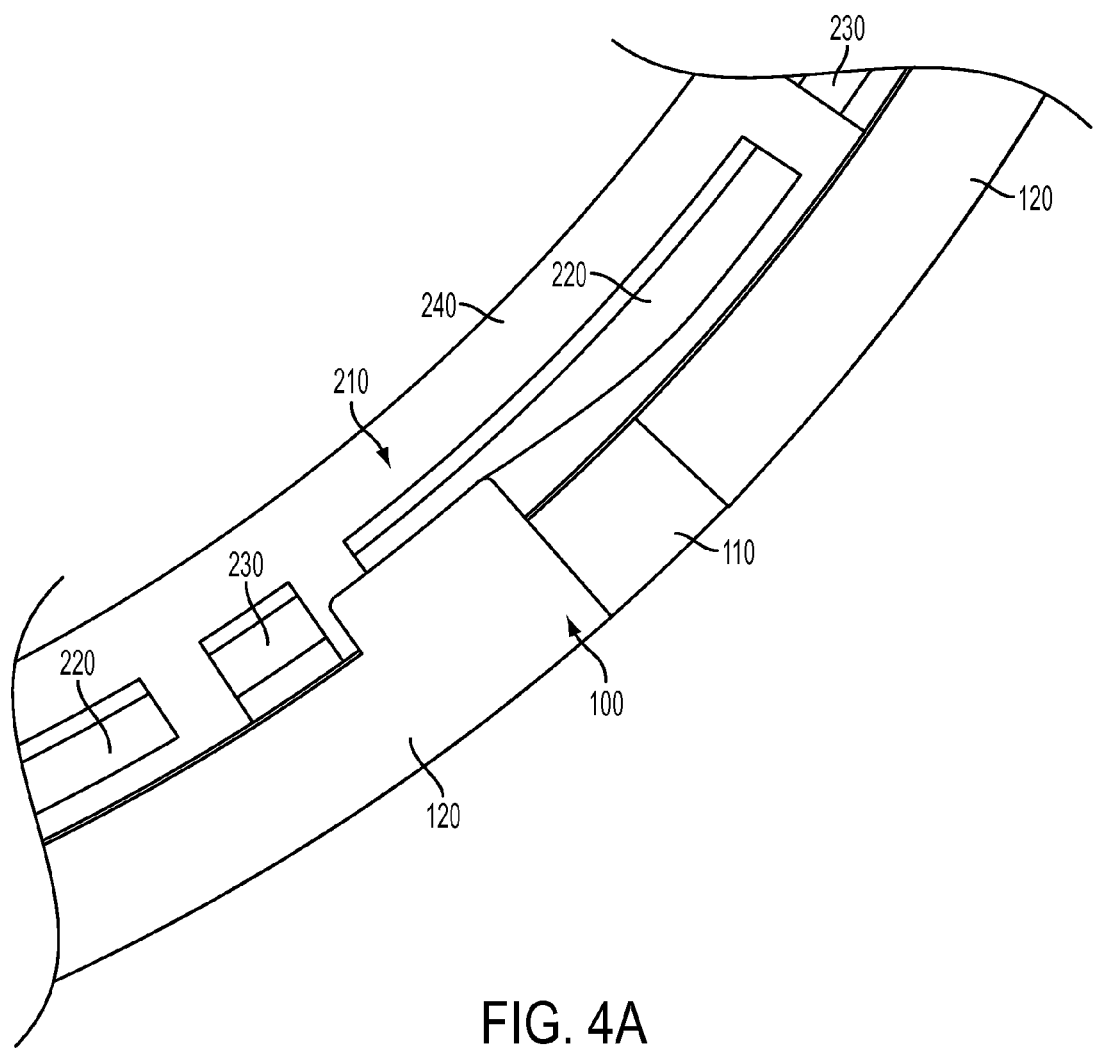
FIGS. 4A and 4B show a top view of the interaction between the insertion tool of FIG. 3 with the mount of FIG. 1, to expand the plurality of flexures.
Figure 4B:
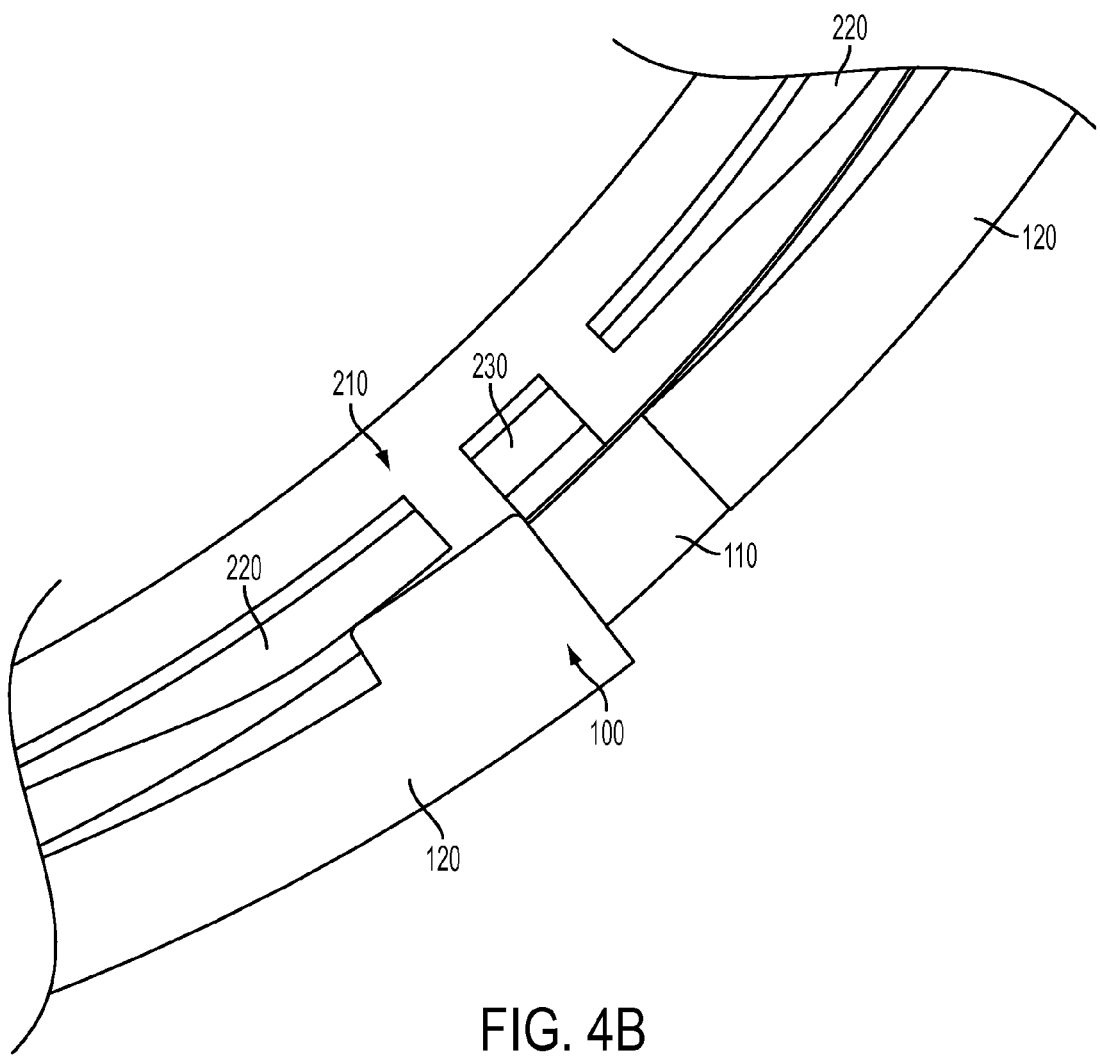

FIGS. 4A and 4B illustrate a top down view of one of plurality of flexures 120 being extended by insertion tool 210. As shown, insertion tool 210 includes ramps 220 and stop tabs 230, mounted to frame 240. In FIG. 4A, when mount 100 is placed onto insertion tool 210, each of plurality of flexures 120 may be positioned between stop tab 230 associated with a prior ramp 220, and a low portion of ramp 220 corresponding to no extension of flexure 120. By rotating insertion tool 210 and mount 100 with respect to one another, each of plurality of flexures 120 may be rotated associated ramps 220, gradually being extended outward, and stopping when flexures 120 contact stop tabs 230, as is shown in FIG. 4B.

Figure 5:
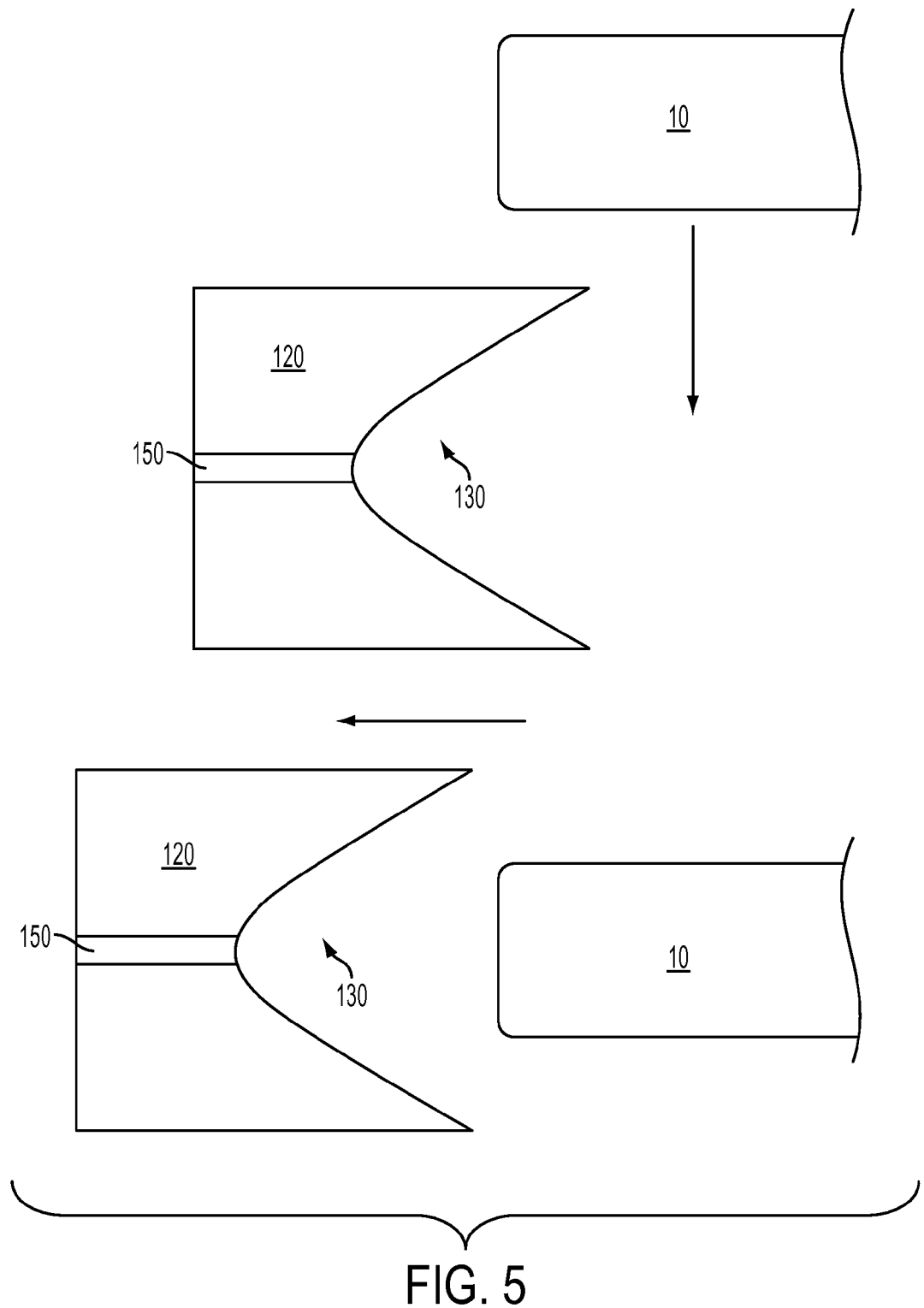
FIG. 5 shows a schematic side cutaway view of an embodiment of the insertion of the element into the plane of the flexures.
Figure 6:
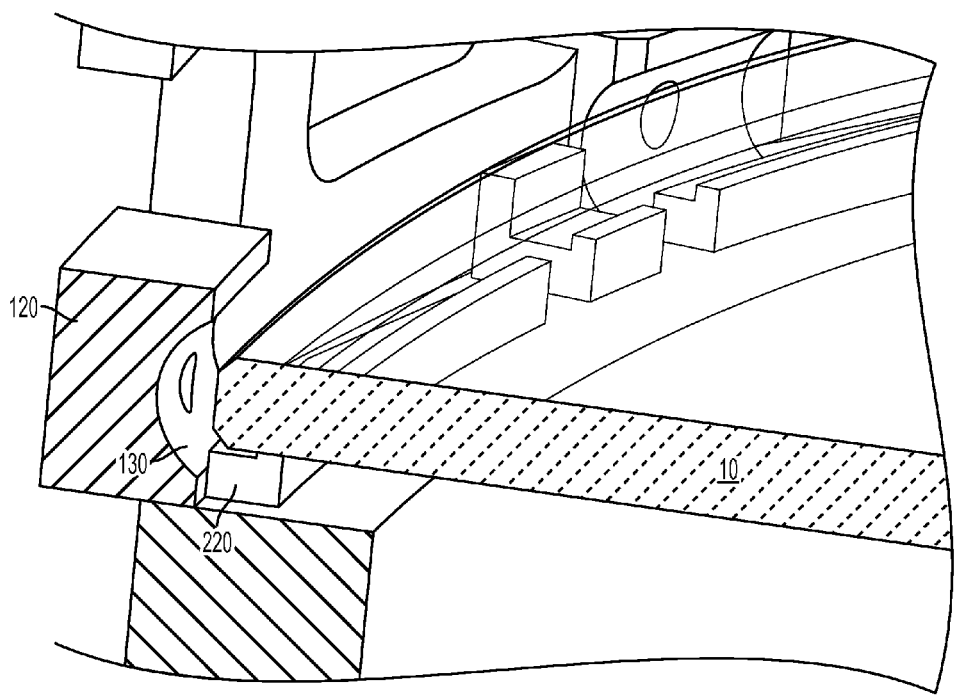
FIG. 6 shows a cross sectional perspective view of the installation of an element into the plane of the flexures, through the use of the installation tool of FIG. 3.
Figure 7A:
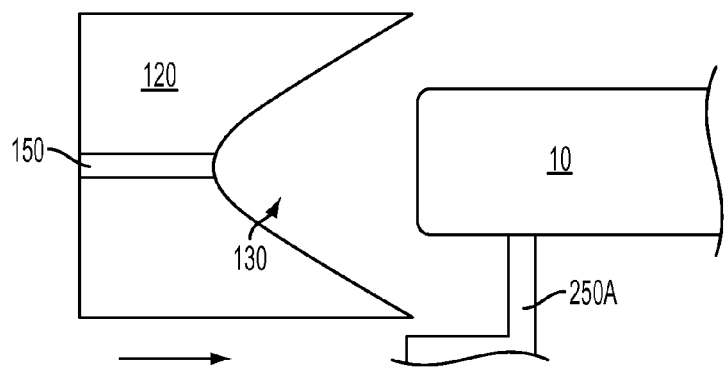
FIGS. 7A-D shows a process of applying intermediate bond between the flexures of the mount and the element, isolating the flexures from the bulk of the element with alignment tools.
Figure 7B:
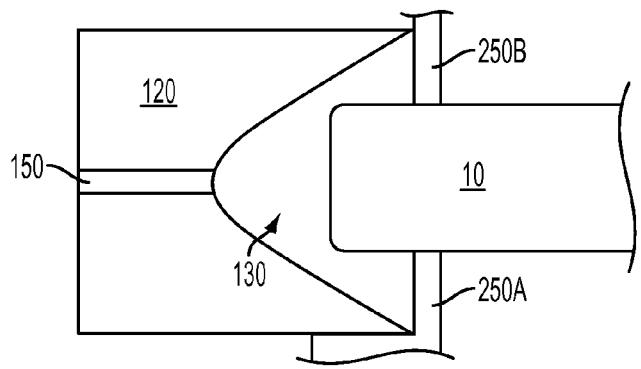
Figure 7C:
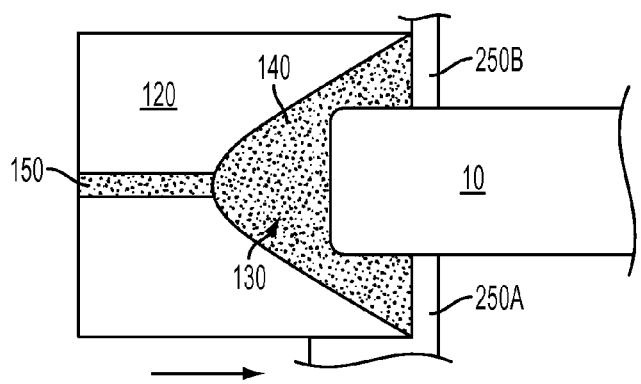
Figure 7D:
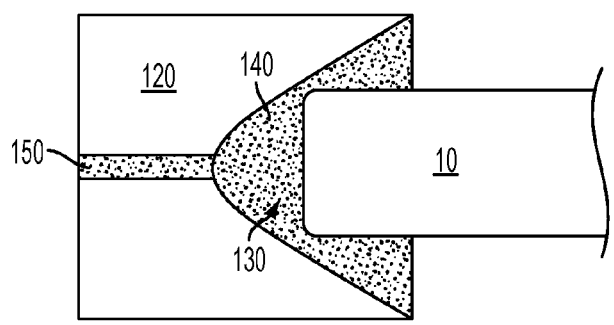

As is shown in FIG. 5, the outward extension of plurality of flexures 120 provides clearance for element 10 to enter the plane of grooved portion 130, such that a retraction of plurality of flexures 120 may provide capture of element 10 by plurality of flexures 120. As is shown in the view of FIG. 6, the height of ramps 220 may provide a temporary support for element 10, holding element 10 within the plane of grooved portion 130 until plurality of flexures 120 may be retracted, and element 10 is captured within grooved portion 130.

In an embodiment, system 200 for mounting element 10 in mount 100 comprises bond 140 applied between element 10 and each of plurality of flexures 120. As seen in FIG. 7, in an embodiment system 200 may comprise first alignment tool 250A and second alignment tool 250B, together configured to isolate grooved portion 130 from the central aperture area of element 10, such that insertion of bond 140 into grooved portion 130 does not cause bond 140 to leak outward onto the central area of element 10 in the central aperture. In some embodiments, first alignment tool 250A may be positioned to maintain some outward extension of plurality of flexures 120, such that first alignment tool 250A may be inserted prior to removal of insertion tool 210. In an embodiment, first alignment tool 250A may substantially align element 10 relative to flexures 120. In an embodiment, with removal of insertion tool 210, flexures 120 retract to contact first alignment tool 250A. While first alignment tool 250A holds flexures 120 in a partially extended position, second alignment tool 250B may be inserted to cover the opposing side of element 10 as first alignment tool 250A. As shown, once both alignment tools 250A-B are positioned to isolate grooved portion 130, bond 140 may be injected or inserted through aperture 150. In an embodiment, alignment tools 250A-B may remain in position surrounding element 10 until bond 140 cures. In embodiments wherein at least the inner edge of element 10 and the inner portion of flexures 120 forming the grooved portion 130 are pre-treated (i.e. primed), bond 140 may adhere to both the inner portion of flexures 120 and the edge portion of element 10 as bond 140 cures.

As is further shown in FIG. 7, in an embodiment the removal of alignment tools 250A-B may permit further retraction of flexures 120, which in an embodiment may cause compression of cured bond 140 against element 10. In other embodiments, alignment tools 250A-B may not hold flexures 120 in an outwardly extended position, but may merely prevent unwanted spreading of bonds 140 over element 10. In an embodiment, the compression of bonds 140 may be configured to prevent bond failure from excessive pressure applied by flexures 120 against element 10, yet be such that element 10 is retained by mount 100 within desired tolerances during acceleration of mount 100 and mounted element 10.

Figure 8:
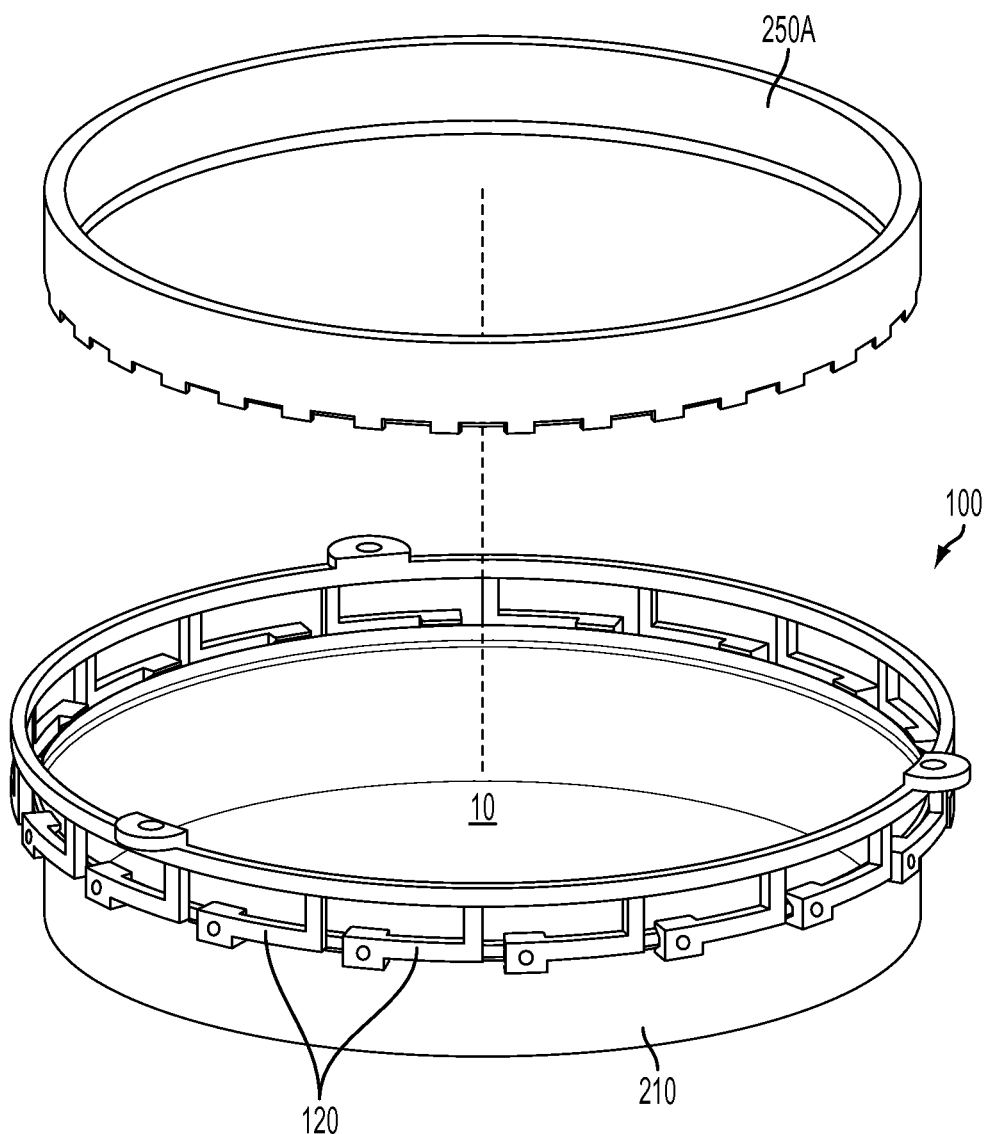
FIG. 8 shows the installation of one of the alignment tools while the installation tool holds the plurality of flexures open.
Figure 9:
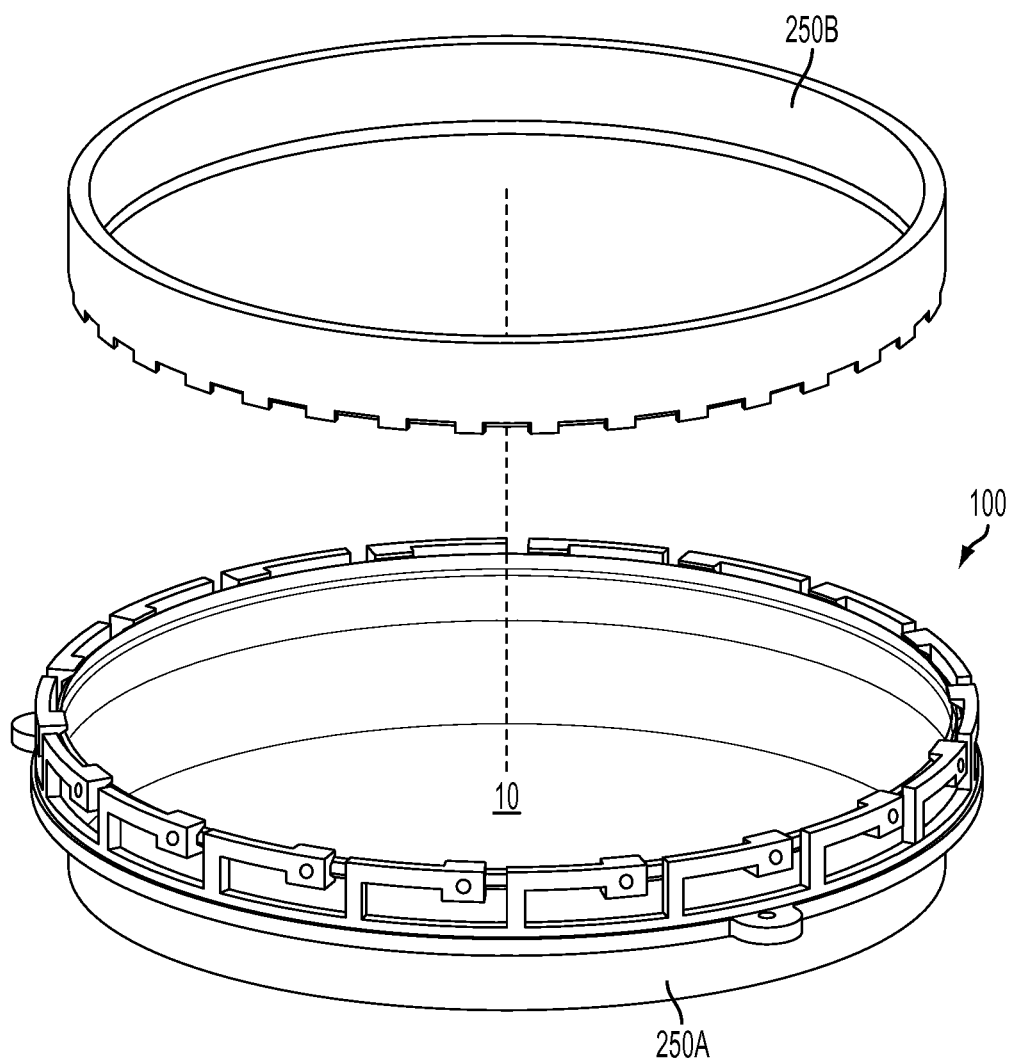
FIG. 9 shows the installation of another alignment tool opposing the alignment tool of FIG. 8, following removal of the insertion tool, while the alignment tool of FIG. 8 holds the plurality of flexures partially open.
Figure 10:
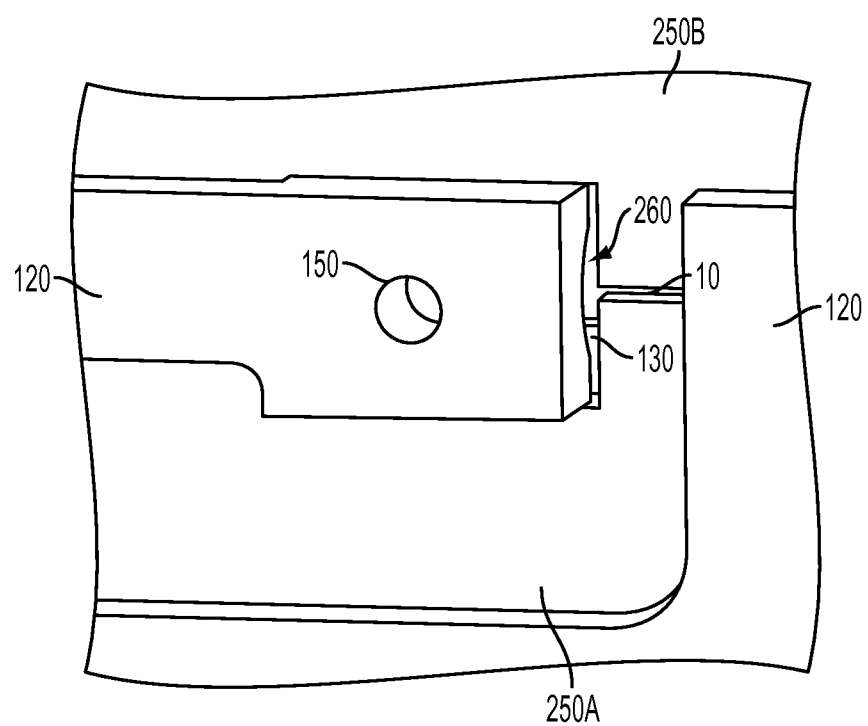
FIG. 10 shows a close-up perspective view of the interaction between one of the flexures, the alignment tools, and the element, for insertion of the bond therein.

In FIGS. 8 and 9, the installation and use of alignment tools 250A-B are shown in greater detail. As seen in FIG. 8, mount 100 may be positioned around insertion tool 210 and rotated such that plurality of flexures 120 are outwardly extended, as is described above. Following insertion of element 10 into mount 100, first alignment tool 250A may be inserted on an opposite side of element 10 as insertion tool 210. Moving on to FIG. 9, insertion tool 210 may then be removed, such that flexures 210 retract inward, down ramps 220. First alignment tool 250A may hold flexures 120 in a partially extended position, such that grooved portions 130 of flexures 120 at least partially capture the outer edge of element 10. As shown, second alignment tool 250B may then be inserted on the opposite side of element 10, so that the grooved portion 130 of flexures 120 is isolated from the central aperture of element 10. The head of one of flexures 120 is shown in greater detail in FIG. 10, which illustrates an edge of element 10 captured within grooved portion 130, and separated from the inner portions of element 10 by alignment tools 250A-B. As is shown, an edge of grooved portion 130 is visible at a side of flexure 120, forming gap 260 between flexure 120 and alignment tools 250A-B. Gap 260 may also include a spacing between flexure 120 and edge of element 10. In an embodiment, insertion of bond 140 through aperture 150 may proceed until bond 140 is visible at gap 260, as is described in greater detail below.

Figure 11:
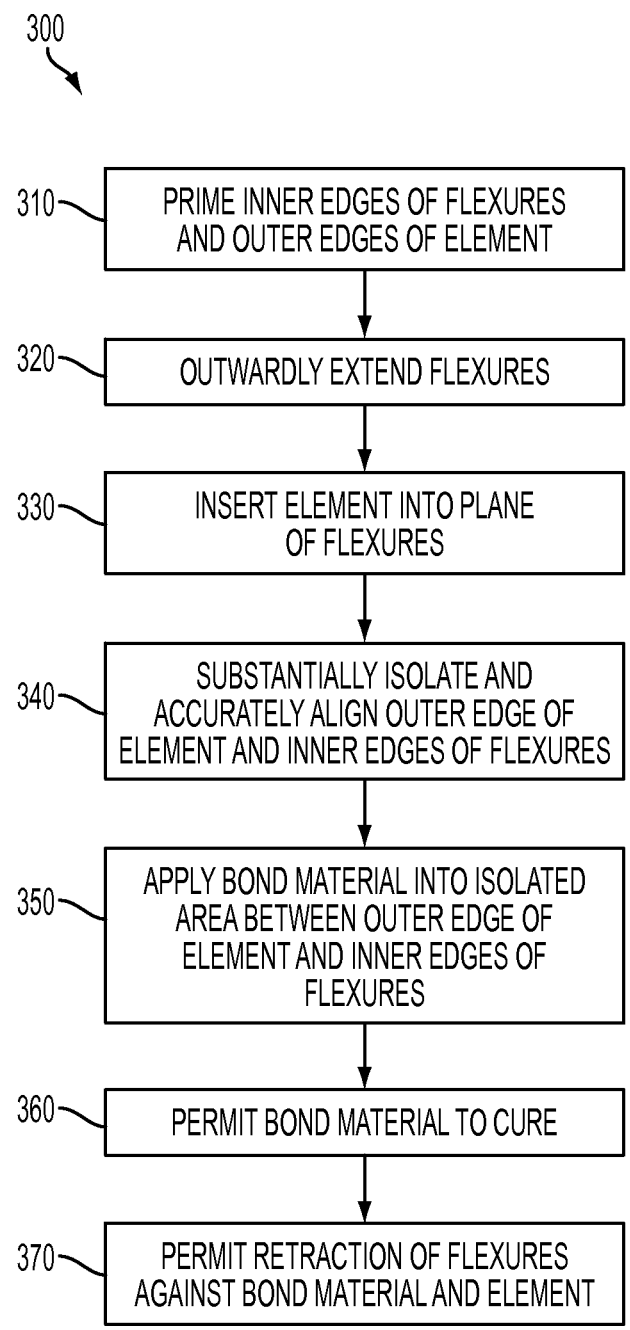
FIG. 11 shows a flowchart of an embodiment of a method for installing the element into the mount.

Another aspect of the present disclosure, illustrated in the non-limiting embodiment of FIG. 11, includes method 300 for mounting element 10 in mount 100. In embodiments wherein bond 140 is to adhere to flexures 120 and/or element 10, method 300 may start at 310 with priming the inner edges of flexures 120 and/or outer edges of element 10. Such priming may depend on the nature of bond 140, and may include coating the inner edges of flexures 120 and/or the outer edges of element 10 with an agent that may react with bond 140 to promote adhesion of bond 140 to those surfaces, as is described above. In some embodiments, only the portion of flexures 120 configured to contact and/or bond with element 10 would be primed.

Method 300 may then continue at 320 to include outwardly extending plurality of flexures 120 that are supported by frame 110. In some embodiments, this may comprise first affixing installation tool 210 to a flat surface. Such attachment may be by any suitable method, including in an embodiment sticking installation tool 210 to the surface by double sided adhesive tape. In some embodiments, priming the flexures 120 at step 310 may occur after installation tool 210 is affixed to the surface. In an embodiment, outwardly extending plurality of flexures 120 may include rotating mount 100 such that flexures 120 are pushed outward along ramps 220 as mount 100 is rotated with respect to installation tool 210. In an embodiment, rotation between installation tool 210 and mount 100 may end when flexures 120 abut against stop tabs 230. In an embodiment, once flexures 120 have been outwardly extended, the combination of mount 100 and installation tool 210 may be detached from the flat surface.

At step 330, method 300 may continue by inserting element 10 into the plane of flexures 120. In some embodiments, element 10 may first be connected to first alignment tool 250A, such that installation tool 210 and first installation tool 250A are substantially separated by element 10 and mount 100. In other embodiments, installation tool 210 may initially support element 10 between flexures 120, and alignment tools 250A-B are inserted later, as is described below. In some embodiments, once element 10 is inserted between flexures 120, method 300 may include at least partially capturing element 10 by flexures 120, such as by retracting flexures 120 such that grooved portion 130 of flexures 120 allows flexures 120 to overlap both upper and lower sides of the edges of element 10. In an embodiment, the presence of first alignment tool 250A along mount 100 may prevent flexures 120 from returning to their nominal position with respect to frame 110.

Method 300 may continue at 340 by substantially isolating the outer edge of element 10 and grooved portion 130 of flexures 120 from the inner areas of element 10. In an embodiment, step 340 may include placing second alignment tool 250B opposite first alignment tool 250A. In an embodiment, this may include creating gap 260 between flexures 120 and alignment tools 250A-B, such that only the edge of element 10 extending into grooved portion 130 may be contacted by bond 140. In an embodiment, method 300 may include clamping the assembly of alignment tools 250A-B, mount 100, and element 10 between flat surfaces, to further isolate the center of element 10.

Moving to step 350, method 300 may further include applying bond 140 into grooved portion 130. In an embodiment, applying bond 140 may comprise injecting bond 140 through apertures 150 of flexures 120. In an embodiment, injecting bond 140 into grooved portion 130 may comprise injecting bond 140 until bond 140 is visible at gap 260. In an embodiment, bond 140 may be injected in each of plurality of flexures 120 in a star pattern, wherein bond 140 is applied to opposing flexures 120 on either side of mount 100 incrementally, such that bond 140 does not displace element 10 by being applied in greater amounts to one side of mount 100.

Once bond 140 has been applied, method 300 may continue at step 360 by allowing bonds 140 to cure. As noted above, in some embodiments, bonds 140 may vulcanize at room temperature. In various embodiments, differing amounts of time may be required for curing of bonds 140. In an embodiment wherein bonds 140 comprise RTV566, curing time may be approximately one day. In other embodiments, curing time for bonds 140 may be approximately one week. In some embodiments, wherein flexures 120 and/or the isolated edge of element 10 have been primed to adhere with bond 140, such adhering may begin to occur on contact between bond 140 and the primed elements, prior to curing. In other embodiments, adhering may occur gradually after bonds 140 begin to cure.

In some embodiments, whiskers or other thin strings of bonds 140 may form at the edges of grooved portions 130. In an embodiment, to prevent the formation of such whiskers, alignment tools 250A-B may be formed from aluminum to discourage static transfer. In an embodiment, an ionizer may additionally or alternatively be utilized during the application of bonds 140 at step 360. Furthermore, in some embodiments bonds 140 may comprise a thickener, which may further reduce flash and whiskering of bonds 140. In some embodiments, such as but not limited to when bonds 140 comprise RTV566, the thickener may include a particulate silica, such as but not limited to those similar to Cab-O-Sil® (manufactured by Cabot Corporation, U.S.A.). In embodiment, the thickener may be included in the bond 140 at approximately 1-2% by weight.

Once bonds 140 have cured at step 360, method 300 may continue at step 370 with retracting flexures 120 against cured bonds 140 and element 10. Such retraction may comprise removing alignment tools 250A-B, which may have provided a tolerable level of outward expansion of flexures 120 during the curing process. In an embodiment, retraction of flexures 120 against bonds 140 may comprise compressing bonds 140. In an embodiment, bonds 140 and element 10 may result in a pressure by flexures 120 against bonds 140 and element 10 further retaining element 10 within mount 100. In an embodiment, element 10, either alone or in combination with bonds 140, may be larger than the nominal diameter of grooved portions 130 of flexures 120, applying an outward pressure on flexures 120 by element 10 and bonds 140. Such a preloading may result in redundancy of capture of element 10 by mount 100, for example through pressure between flexures 120 and element 10 through bonds 140, adhesion from bonds 140 between flexures 120 and the edges of element 10, and/or the beveled or otherwise grooved shape of flexures 120 to capture the edges of element 10.

While certain embodiments have been shown and described, it is evident that variations and modifications are possible that are within the spirit and scope of the inventive concept as represented by the following claims. The disclosed embodiments have been provided solely to illustrate the principles of the inventive concept and should not be considered limiting in any way.

What is claimed is:

1. A mount for a mountable element comprising:
   an annular frame defining a central aperture;

a plurality of grooved flexures mechanically coupled to said frame, each grooved flexure comprising a cantilevered L-shaped arm comprising a first arm member extending axially from the frame at an attached end, a second arm member integrally part of a distal end of the first arm member extending in a circumferential direction, and a groove disposed on an unattached end of the cantilevered L-shaped arm, the plurality of grooved flexures defining a channel around a periphery of said central aperture, and configured to be radially outwardly extendable against a restorative bias for receiving an edge portion of the mountable element in the channel; wherein for each grooved flexure, the groove, second arm member and distal end are in the same plane as the plane defined by the grooves and the periphery of the mountable element, and wherein the unattached end of one grooved flexure is circumferentially adjacent and circumferentially spaced-apart from the distal end of a circumferentially adjacent flexure; and a plurality of intermediate bonds, arranged between the plurality of grooved flexures and the mountable element, said intermediate bonds being configured to cushion the mountable element against an acceleration of the mount, and to compensate for a mismatch between different coefficients of thermal expansion of the flexures and the mountable element so as to reduce a distortion of the mountable element.

2. The mount of claim 1, wherein each of the plurality of grooved flexures comprise a flexure aperture configured to allow insertion of the intermediate bonds between the grooved flexure and the edge portion of the mountable element.

3. The mount of claim 1, wherein the intermediate bonds comprise a room temperature vulcanization material.

4. The mount of claim 3, wherein the room temperature vulcanization material comprises silicone rubber.

5. The mount of claim 1, wherein the mountable element comprises an optic element, and wherein the distortion comprises a transmitted wavefront error through the optic element.

6. The mount of claim 5, wherein the plurality of grooved flexures and the plurality of intermediate bonds are configured to enable the transmitted wavefront error to be less than 0.006 μm/0.6" diameter, over a temperature of approximately 135 K to 298K, and the acceleration of up to approximately 12500 rad/s$^2$.

7. The mount of claim 1, wherein the plurality of grooved flexures is formed integral to said frame.

* * * * *